United States Patent
Konishi et al.

(10) Patent No.: US 10,782,160 B2
(45) Date of Patent: Sep. 22, 2020

(54) ENCODER SCALE, METHOD FOR MANUFACTURING ENCODER SCALE, ENCODER, ROBOT, AND PRINTER

(71) Applicant: Seiko Epson Corporation, Tokyo (JP)

(72) Inventors: Akio Konishi, Matsumoto (JP); Yutaka Arakawa, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 143 days.

(21) Appl. No.: 15/966,270

(22) Filed: Apr. 30, 2018

(65) Prior Publication Data

US 2018/0313672 A1    Nov. 1, 2018

(30) Foreign Application Priority Data

May 1, 2017 (JP) .................................. 2017-091156

(51) Int. Cl.
    *G01D 5/347* (2006.01)
(52) U.S. Cl.
    CPC ....... *G01D 5/34707* (2013.01); *G01D 5/3473* (2013.01); *G01D 5/34746* (2013.01)
(58) Field of Classification Search
    CPC .............................................. G01D 5/34707
    See application file for complete search history.

(56) References Cited

U.S. PATENT DOCUMENTS

| 4,387,299 A * | 6/1983 | Akiyama | G01C 22/02 250/227.11 |
| 6,222,690 B1* | 4/2001 | Tanaka | G11B 15/54 242/334.4 |
| 6,803,560 B1* | 10/2004 | Okumura | G01D 5/38 250/231.13 |
| 2001/0046055 A1* | 11/2001 | Speckbacher | G01D 5/38 356/499 |
| 2004/0195331 A1* | 10/2004 | Imai | B29C 45/0046 235/454 |

FOREIGN PATENT DOCUMENTS

| JP | 2012-159518 A | 8/2012 |
| JP | 2013-221818 A | 10/2013 |

* cited by examiner

*Primary Examiner* — Thanh Luu
(74) *Attorney, Agent, or Firm* — Harness, Dickey & Pierce, P.L.C.

(57) ABSTRACT

An encoder scale includes a plate-shaped base mount and an optical pattern that is provided on one surface of the base mount and has alternately arranged first regions and second regions. The first regions are each primarily formed of a first surface a normal to which extends in the thickness direction of the base mount, and the second regions are each primarily formed of a second surface that inclines with respect to the first surface.

20 Claims, 15 Drawing Sheets

ENCODER SCALE, METHOD FOR MANUFACTURING ENCODER SCALE, ENCODER, ROBOT, AND PRINTER

BACKGROUND

1. Technical Field

The present invention relates to an encoder scale, a method for manufacturing the encoder scale, an encoder, a robot, and a printer.

2. Related Art

An optical encoder has been known as a kind of encoder (see JP-A-2012-159518, for example). For example, the reflective optical encoder described in JP-A-2012-159518 includes a light source, a light detector, and a scale that has an optical pattern and moves relative to the light source and the light detector, and in operation, the light source emits a light beam toward the scale, and the light detector detects the light beam reflected off and modulated by the scale. The scale descried in JP-A-2012-159518 includes a glass substrate and a periodic optical pattern formed on a surface of the glass substrate, and the optical pattern is formed of a plurality of metal thin films one-dimensionally arranged in the movement direction of the scale.

The scale described in JP-A-2012-159518 has problems of low shape flexibility and difficulty in cost reduction because the substrate is made of glass. Further, since the scale described in JP-A-2012-159518 is so configured that the surface of the glass substrate portion where no metal film is formed extends in parallel to the surface of the glass substrate portion where the metal films are formed extends, part of the light beam that has not passed through the portion but has been reflected off the portion is detected with the light detector, undesirably resulting in difficulty in increasing the detection accuracy.

SUMMARY

An advantage of some aspects of the invention is to provide an encoder scale that allows an increase in detection accuracy along with cost reduction and a method for manufacturing the encoder scale. Another advantage of some aspects of the invention is to provide an encoder, a robot, and a printer including the encoder scale.

The advantage described above can be achieved by the following configuration.

An encoder scale according an aspect of the invention includes a plate-shaped base mount and an optical pattern that is provided on one surface of the base mount and has alternately arranged first regions and second regions, the first regions are each primarily formed of a first surface a normal to which extends in a thickness direction of the base mount, and the second regions are each primarily formed of a second surface that inclines with respect to the first surface.

According to the thus configured encoder scale, since the first regions are each formed of the first surface, a normal to each of which extends in the thickness direction of the base mount, and the second regions are each formed of the second surface, which inclines with respect to the first surface, the light reflected off the first regions and the light reflected off the second regions are allowed to travel in directions different from each other, whereby only the light reflected off the first regions can be selectively received. The base mount does not therefore need to be made of a transparent material, whereby the material of the base mount can be selected with increased flexibility. As a result, a material that is less expensive and more excellent in processability can be used. Further, the amount of received light in the state in which the first regions are irradiated with light and the amount of received light in the state in which the first regions are not irradiated with the light are allowed to greatly differ from each other, resulting in an increase in the detection accuracy.

In the encoder scale according to the aspect of the invention, it is preferable that the base mount is made of an anisotropically etchable crystal material.

With this configuration, the optical pattern can be formed with precision. Further, the crystal planes of a crystal material can be used to form the first surfaces and the second surfaces.

In the encoder scale according to the aspect of the invention, it is preferable that the crystal material is single-crystal silicon.

Single-crystal silicon is less expensive than the other crystal materials and is readily processed with precision. When the base mount of the encoder scale is made of single-crystal silicon, reduction in the cost of the encoder scale and precise manufacturing thereof can be readily and advantageously achieved.

In the encoder scale according to the aspect of the invention, it is preferable that the single-crystal silicon has (100) plane orientation.

With this configuration, the [100] plane of the single crystal can be used to form the first surfaces, and the [111] plane of the single crystal can be used to form the second surfaces. The [111] plane appears every 90° in the plane of the base mount. The thus selected single-crystal silicon can therefore be used to form not only a linear encoder but an encoder scale suitable for a rotary encoder.

In the encoder scale according to the aspect of the invention, it is preferable that the second surfaces are each provided along a crystal plane of the crystal material.

With this configuration, the second surfaces can be so readily formed that the inclination angle thereof with respect to the first surface varies only by a small amount.

It is preferable that the encoder scale according to the aspect of the invention further includes a metal film disposed in each of the first regions.

The reflectance of the light in the first regions can therefore be increased irrespective of the material of which the base mount is made. Further, in a case where the second regions are formed in an etching process, the metal film can be used as a metal mask used in the etching process, whereby the manufacturing cost of the encoder scale can be reduced.

In the encoder scale according to the aspect of the invention, it is preferable that recesses are provided in the one surface of the base mount in correspondence with the second regions.

The second regions (second surfaces) can therefore be readily formed in an etching process.

In the encoder scale according to the aspect of the invention, it is preferable that a plurality of protrusions are provided in each of the second regions of the base mount, and that the second surfaces are formed by using side surfaces of the protrusions.

With this configuration, in the case where the second regions (second surfaces) are formed in an etching process, the amount of etching can be reduced, whereby the manufacturing period can be shortened and the manufacturing cost can be reduced accordingly.

A method for manufacturing an encoder scale according to another aspect of the invention is a method for manufacturing an encoder scale, the method including an optical pattern formation step of forming an optical pattern on one surface of a plate-shaped base mount, the optical pattern having alternately arranged first regions and second regions, the first regions each primarily formed of a first surface a normal to which extends in a thickness direction of the base mount and the second regions each primarily formed of a second surface that inclines with respect to the first surface, and the second regions are formed in an anisotropic etching process.

According to the thus configured method for manufacturing an encoder scale, an encoder scale that allows an increase in detection accuracy with cost reduction can be produced.

An encoder according to another aspect of the invention includes the encoder scale according to the aspect of the invention.

The thus configured encoder allows an increase in detection accuracy with cost reduction.

An encoder according to another aspect of the invention includes an encoder scale, a light source section that outputs light toward the encoder scale, and a light receiving section that receives the light reflected off the encoder scale, the encoder scale includes a plate-shaped base mount, and an optical pattern that is provided on one surface of the base mount and has alternately arranged first regions and second regions, the first regions are each primarily formed of a first surface a normal to which extends in a thickness direction of the base mount, and the second regions are each primarily formed of a second surface that reflects the light in a direction different from a direction in which the light is reflected off the first surface.

The thus configured encoder allows an increase in detection accuracy with cost reduction.

A robot according to another aspect of the invention includes the encoder scale according to the aspect of the invention.

According to the thus configured robot, the cost reduction achieved by the encoder scale allows reduction in cost of the robot. Further, the operation of the robot can be controlled with precision based on a result of precise detection using the encoder scale.

A printer according to another aspect of the invention includes the encoder scale according to the aspect of the invention.

According to the thus configured printer, the cost reduction achieved by the encoder scale allows reduction in cost of the printer. Further, the operation of the printer can be controlled with precision based on a result of precise detection using the encoder scale.

BRIEF DESCRIPTION OF THE DRAWINGS

The invention will be described with reference to the accompanying drawings, wherein like numbers reference like elements.

DESCRIPTION OF EXEMPLARY EMBODIMENTS

An encoder scale, a method for manufacturing the encoder scale, an encoder, a robot, and a printer according to preferable embodiments of the invention will be described below in detail with reference to the accompanying drawings.

Encoder

Before the encoder scale according to an embodiment of the invention is described, the encoder according to an embodiment of the invention (encoder including encoder scale according to embodiment of invention) will first be briefly described.

Figure 1:
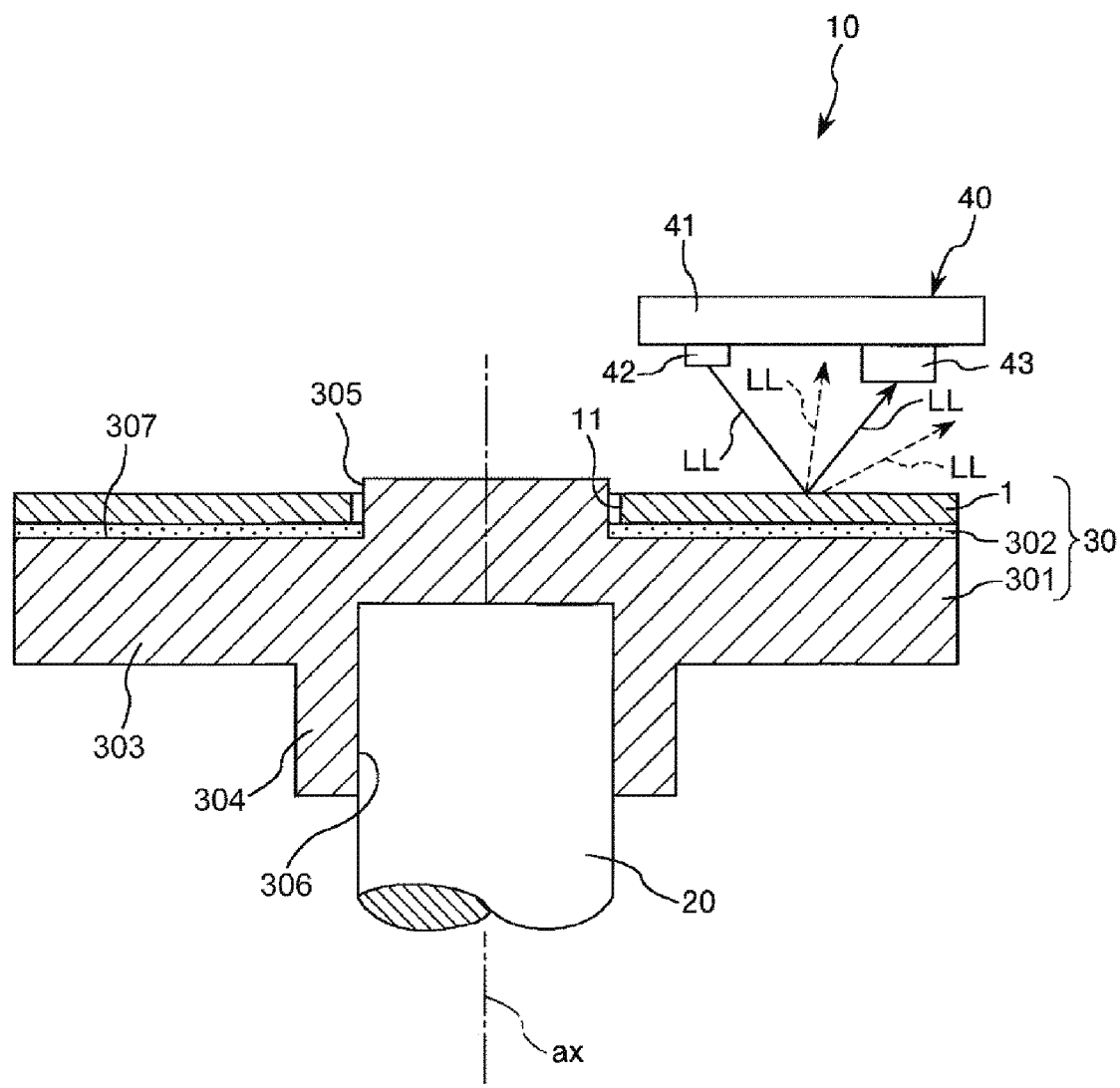
FIG. 1 is a longitudinal cross-sectional view showing an encoder according to a first embodiment of the invention.
Figure 2:
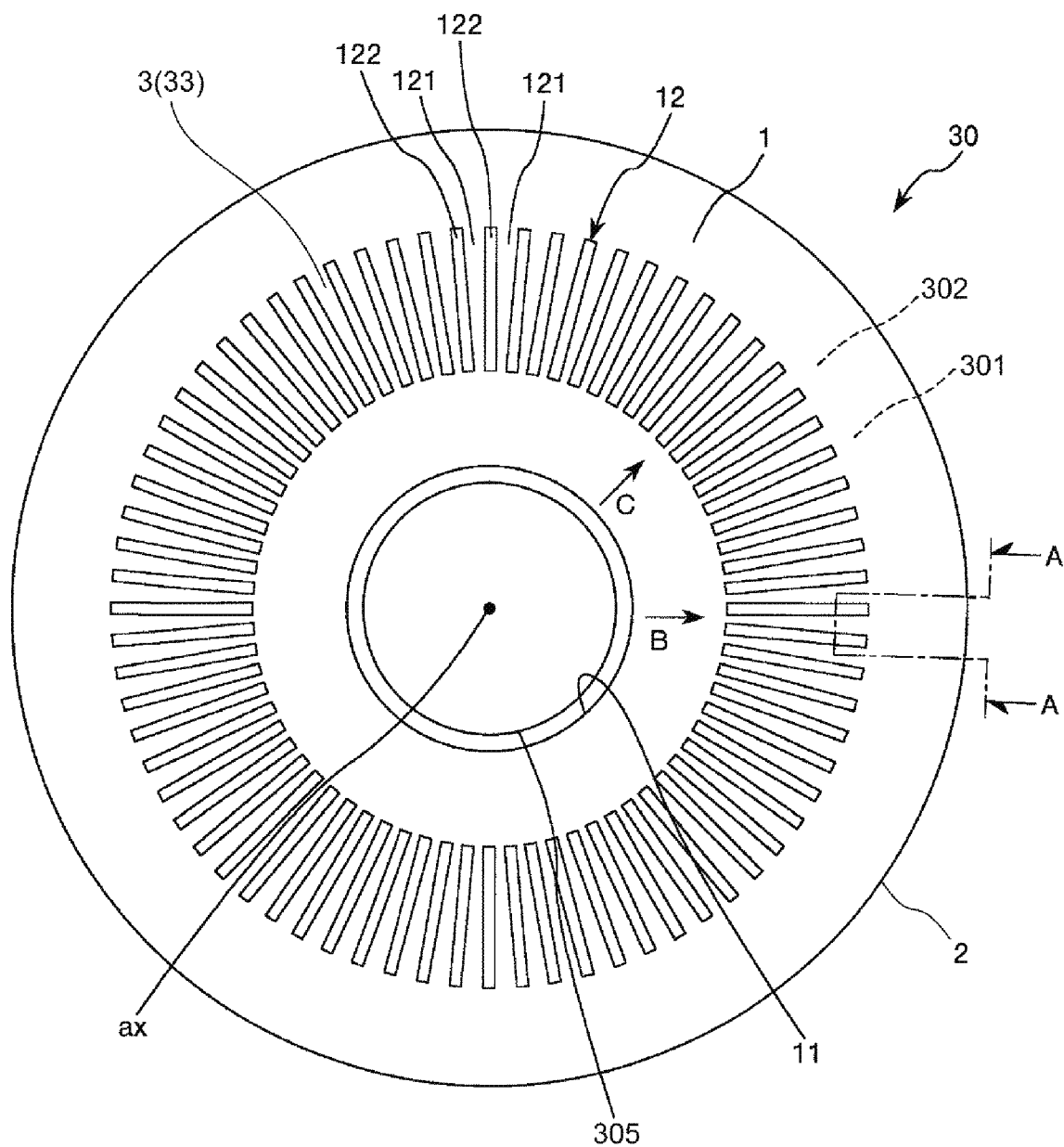
FIG. 2 is a plan view of an encoder scale unit provided in the encoder shown in FIG. 1.

FIG. 1 is a longitudinal cross-sectional view showing an encoder according to a first embodiment of the invention. FIG. 2 is a plan view of an encoder scale unit provided in the encoder shown in FIG. 1. In the following description, the upper side in FIG. 1 is called "upper," and the lower side in FIG. 1 is called "lower."

An encoder 10 shown in FIG. 1 includes an encoder scale unit 30, which is fixed to an end portion of a rotary shaft 20 of a motor or any other component that is not shown, and an optical sensor 40, which detects the state of the rotation of the encoder scale unit 30.

The encoder scale unit 30 includes a hub 301, which is fixed to the rotary shaft 20, and an encoder scale 1, which is bonded to a support section 303 of the hub 301 with an adhesive 302, such as an epoxy-based adhesive and an acrylic adhesive.

The hub 301 includes the support section 303, which has a disc-like shape, a protruding section 304, which protrudes from one-side (lower side in FIG. 1) surface (lower surface)

of the support section 303, a protrusion 305, which protrudes from the-other-side (upper side in FIG. 1) surface (upper surface) of the support section 303, and a recess 306, which opens through the end surface (lower surface in FIG. 1) of the protruding section 304, and the support section 303, the protruding section 304, the protrusion 305, and the recess 306 are coaxially provided with respect to an axial line ax as a center line. The end portion of the rotary shaft 20 is inserted (press-fit, for example) into the recess 306 and fixed thereto. The thus configured hub 301 is not necessarily made of a specific material and is, for example, made of aluminum, stainless steel, or any other metal material. In place of the recess 306, the hub 301 may be provided with a through hole into which the rotary shaft 20 is inserted. The hub 301 may instead be integrated with the rotary shaft 20.

The upper surface of the support section 303 is a placement surface 307, on which the encoder scale 1 is placed. The upper surface (placement surface 307) of the support section 303 is provided with the protrusion 305, which functions as a positioner for positioning the encoder scale 1 in the in-plane direction. In the present embodiment, the protrusion 305 has a circular outer shape when viewed in the direction along the axial line ax (hereinafter also referred to as "plan view"), as shown in FIG. 2. The protrusion 305 is so formed that the center axis thereof coincides with the center axis of the rotary shaft 20 (axial line ax). The protrusion 305 does not necessarily have a circular outer shape in the plan view and may instead have, for example, a quadrangular shape, a pentagonal shape, or any other polygonal shape.

The encoder scale 1 has a plate-like shape (disc-like shape), and a hole 11, which passes through the encoder scale 1 in the thickness direction (upward/downward direction in FIG. 1) is formed in a central portion of the encoder scale 1. The protrusion 305 described above is inserted into the hole 11. In the present embodiment, the hole 11 has a circular shape in the plan view, as shown in FIG. 2. The diameter of the protrusion 305 (at room temperature) is so set as to be smaller than the diameter of the hole 11 (at room temperature). The hole 11 does not necessarily have a circular outer shape in the plan view and may instead have, for example, a quadrangular shape, a pentagonal shape, or any other polygonal shape or may differ from the outer shape of the protrusion 305 described above in the plan view.

On the upper surface of the encoder scale 1 is formed, as a pattern that allows detection of the amount of rotation (angle) of the encoder scale 1 and the rotational speed and other factors thereof, an optical pattern 12 having first regions 121 and second regions 122, which are alternately arranged along the circumferential direction around the axial line ax and reflect light LL in different directions, as shown in FIG. 2. The first regions 121 and the second regions 122 are formed of surfaces normals to which extend in different directions. The encoder scale 1 will be described later in detail.

The optical sensor 40 includes a light source section 42, which includes a laser diode, a light emitting diode, or any other light emitting device that emits the light LL toward the encoder scale 1 of the encoder scale unit 30, and a light receiving section 43, which includes a photodiode or any other light receiving device that receives the light LL from the encoder scale 1 (reflected light), and the light source section 42 and the light receiving section 43 are mounted on a substrate 41.

The thus configured optical sensor 40 alternately operates in a state in which the light LL reflected off the optical pattern 12 enters the light receiving section 43 (state of light LL indicated by solid line in FIG. 1) and a state in which the light LL reflected off the optical pattern 12 does not enter the light receiving section 43 (state of light LL indicated by broken lines in FIG. 1) as the encoder scale 1 rotates around the axial line ax, because the optical pattern 12 described above is formed on the upper surface (surface irradiated with light) of the encoder scale 1. The waveform of an output signal (current value) from the light receiving section 43 therefore changes as the encoder scale 1 rotates around the axial line ax. The state of the rotation of the encoder scale 1 (such as angle of rotation and rotational speed) can be detected based on the output signal from the light receiving section 43.

Although not shown, the light receiving section includes two light receiving devices provided in different positions in the circumferential direction around the axial line ax; one of the light receiving devices outputs a phase-A signal, and the other light receiving device outputs a phase-B signal that is out of phase by 45° with respect to the phase-A signal. The light source section 42 may include two light emitting devices corresponding to the two light receiving devices provided in the light receiving section 43 or may use a slit plate or any other component to split light from one light emitting device in correspondence with the two light receiving devices. The light source section 42 and the light receiving section 43 may each include a lens and other optical elements.

The encoder 10 has been briefly described. The encoder scale 1 will be described below in detail.

Encoder Scale

Figure 3:
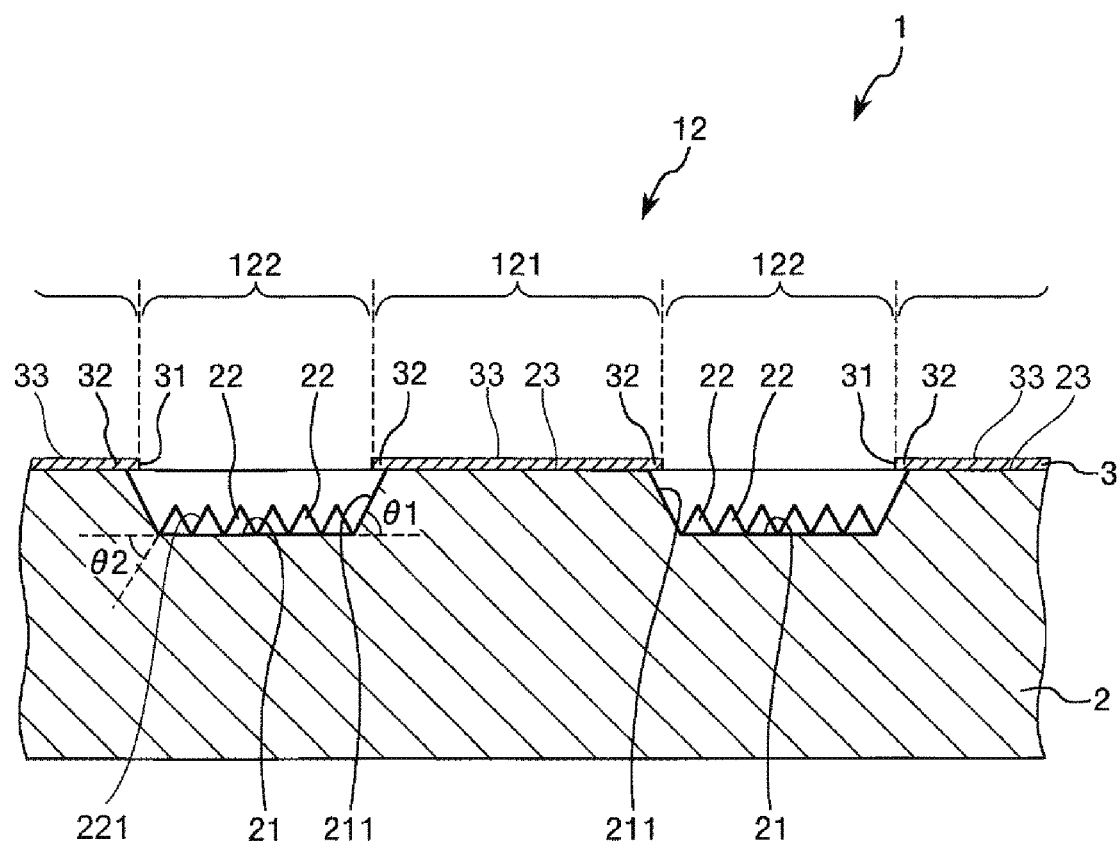
FIG. 3 is a cross-sectional view taken along the line A-A in FIG. 2 (cross-sectional view of encoder scale).
Figure 4:
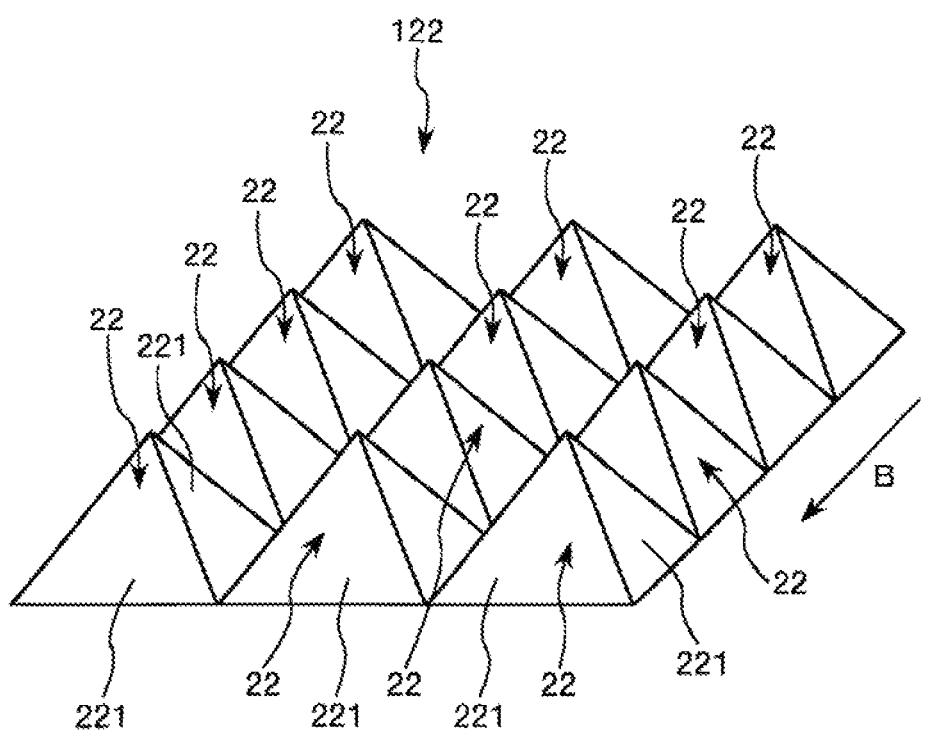
FIG. 4 is a perspective view showing part of second regions (plurality of protrusions) shown in FIG. 3.
Figure 5:
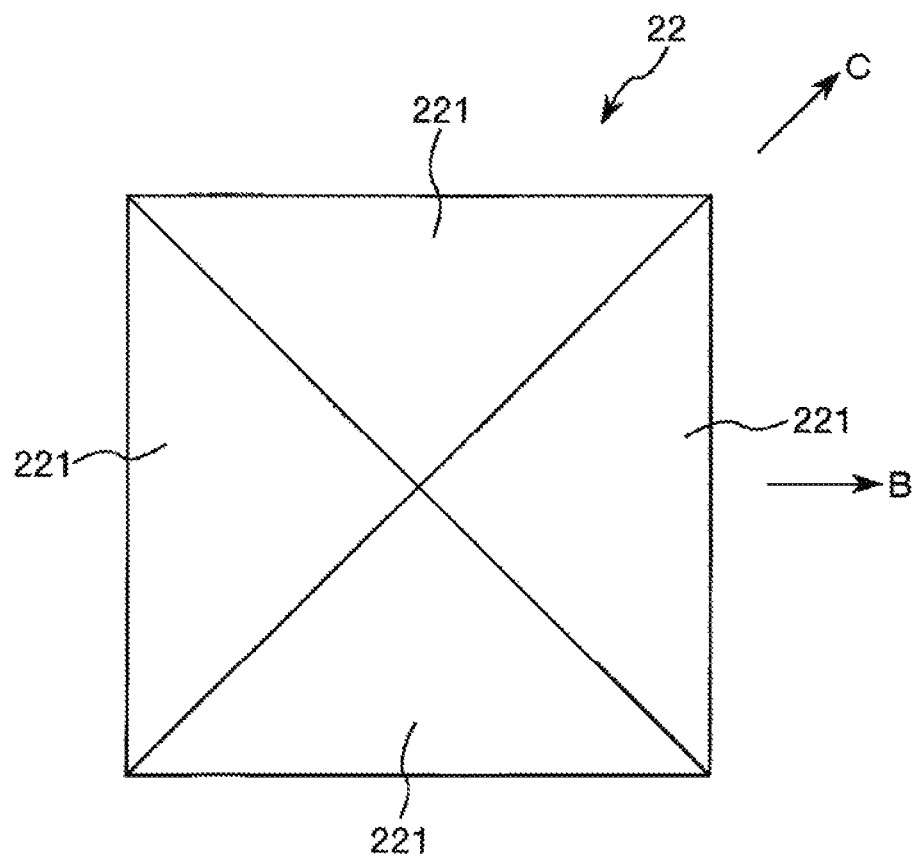
FIG. 5 is a plan view of one of the protrusions (second surfaces) provided in the second region shown in FIG. 3.
Figure 6:
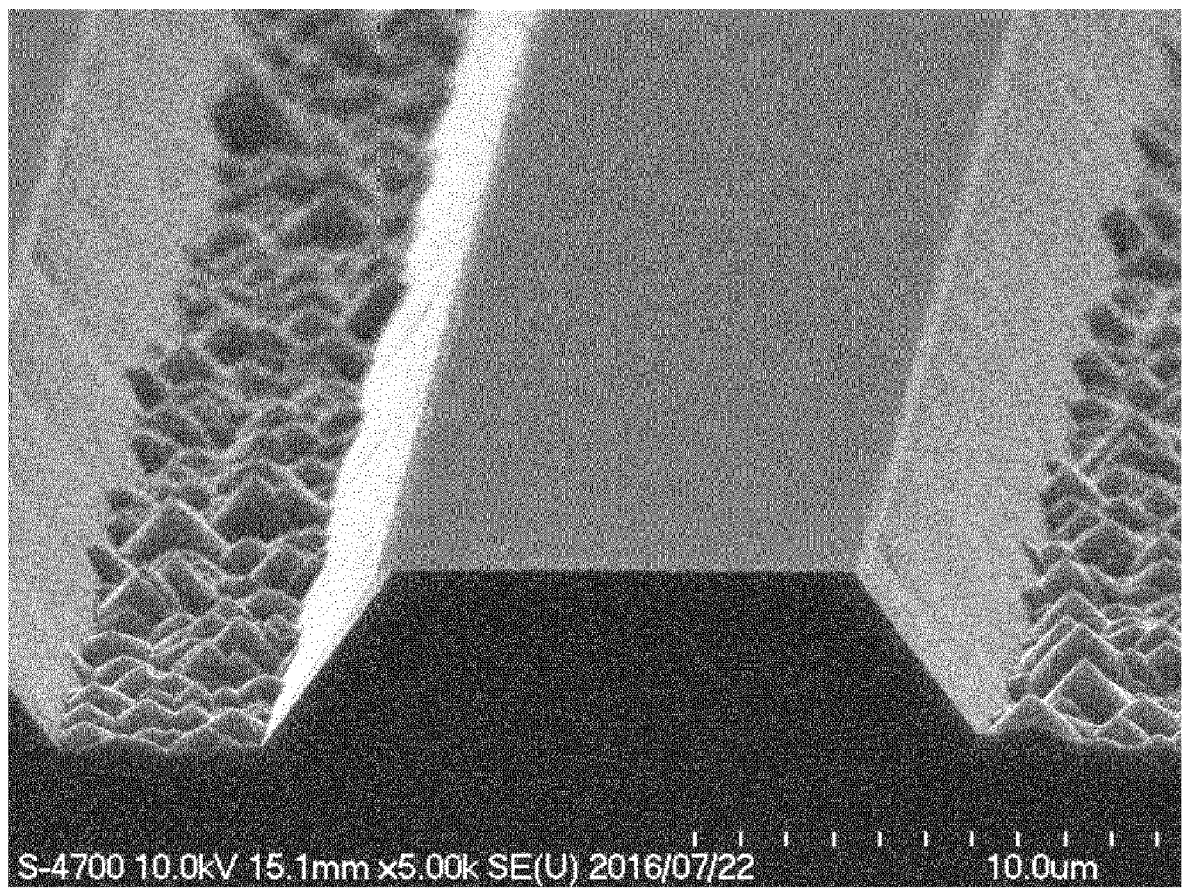
FIG. 6 is a SEM photograph showing part of the encoder scale (first regions and second regions) formed by anisotropic etching of single-crystal silicon.
Figure 7:
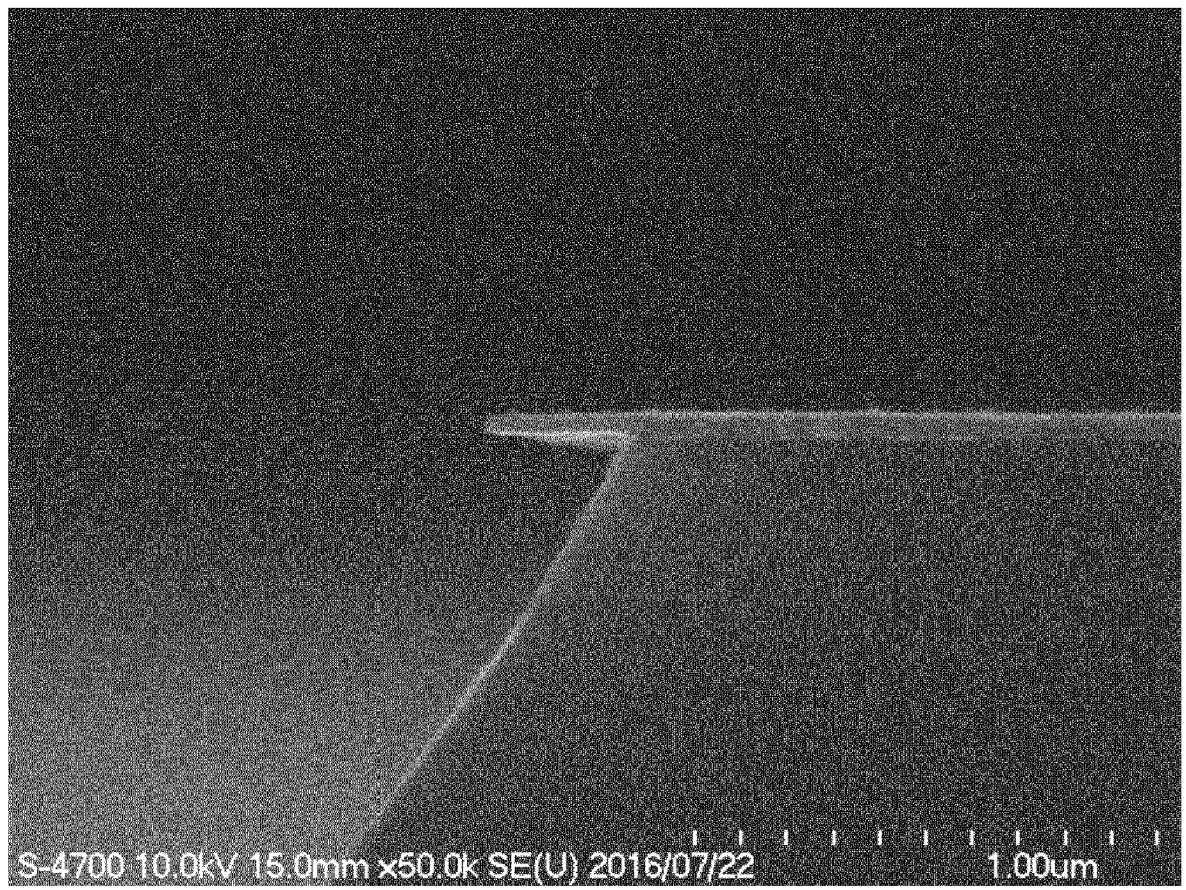
FIG. 7 is a SEM photograph showing part of the encoder scale (cross section in the vicinity of edge portion of metal film) formed by anisotropic etching of single-crystal silicon.
Figure 8:
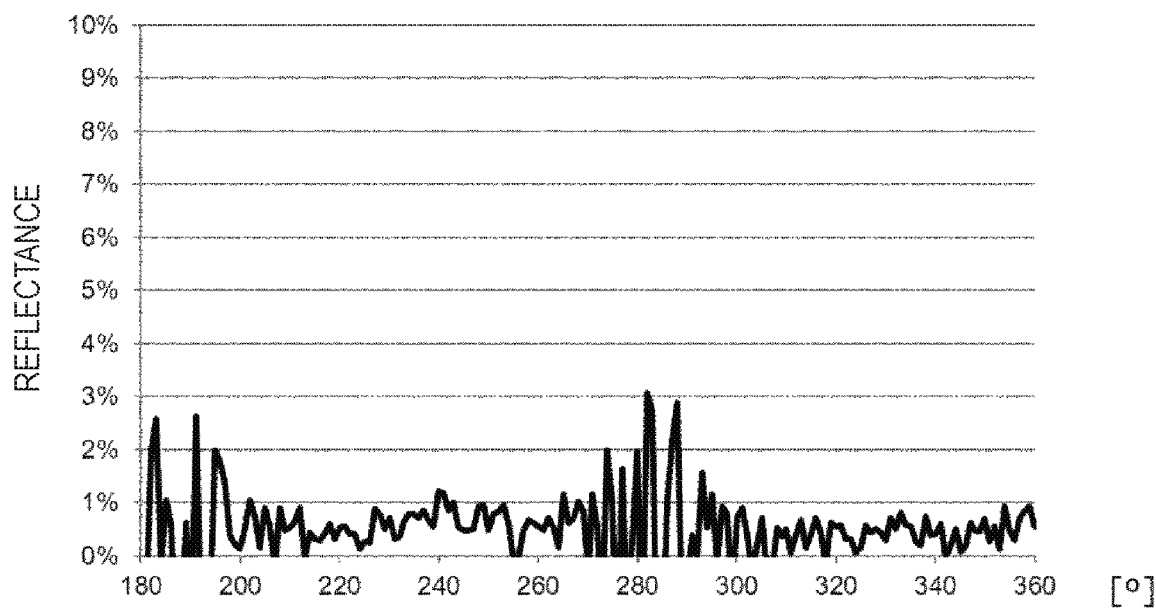
FIG. 8 is a graph showing the light reflection characteristic of the second regions (relationship between angle of rotation and amount of light received by light receiving section) in the case where the encoder scale is formed by anisotropic etching of single-crystal silicon.

FIG. 3 is a cross-sectional view taken along the line A-A in FIG. 2 (cross-sectional view of encoder scale). FIG. 4 is a perspective view showing part of the second regions (plurality of protrusions) shown in FIG. 3. FIG. 5 is a plan view of one of the protrusions provided in each of the second regions shown in FIG. 3. FIG. 6 is a SEM photograph showing part of the encoder scale (first regions and second regions) formed by anisotropic etching of single-crystal silicon. FIG. 7 is a SEM photograph showing part of the encoder scale (cross section in the vicinity of edge portion of metal film) formed by anisotropic etching of single-crystal silicon. FIG. 8 is a graph showing the light reflection characteristic of the second regions (relationship between angle of rotation and amount of light received by light receiving section) in the case where the encoder scale is formed by anisotropic etching of single-crystal silicon. In the following description, the upper side in FIG. 3 is called "upper," and the lower side in FIG. 3 is called "lower."

As described above, the optical pattern 12, which has the first regions 121 and the second regions 122, which are alternately arranged along the circumferential direction around the axial line ax and reflect the light LL in different directions, is formed on the upper surface of the encoder scale 1. The first regions 121 and the second regions 122 of the optical pattern 12 each extend along the radial direction of the encoder scale 1. In FIG. 2, the width of the second regions 122 is fixed along the radial direction of the encoder scale 1 when the encoder scale 1 is viewed from the direction along the axial line ax, and the width of the first regions 121 therefore increases with distance in the radial direction from the inner side toward the outer side of the encoder scale 1. The relationship between the two widths may instead be reversed from the relationship shown in FIG. 2.

The encoder scale 1 includes a plate-shaped (disc-shaped) base mount 2 and a metal film 3 provided on the upper surface of the base mount 2. A plurality of recesses 21 are provided in the upper surface of the base mount 2 in correspondence with the plurality of second regions 122. Further, a plurality of openings 31 (through holes) are provided in the metal film 3 in correspondence with the plurality of second regions 122. Therefore, the metal film 3 is provided in the first regions 121, and the upper surface of the metal film 3 forms the first regions 121 as reflection surfaces 33. On the other hand, no metal film 3 is provided in the second regions 122, and the surfaces of the base mount 2 that are exposed through the openings 31 in the metal film 3, that is, the inner wall surfaces (sidewall surfaces and bottom surfaces) of the recesses 21 form the second regions 122. The depth of the recesses 21 is not limited to a specific value and is preferably greater than or equal to 1 μm but smaller than or equal to 10 μm, more preferably greater than or equal to 2 μm but smaller than or equal to 4 μm. In a case where the recesses 21 are formed in an etching process that will be described later, the depth described above allows the recesses 21 to be readily formed and further allows the function of the recesses 21 to be provided necessarily and sufficiently.

In particular, a plurality of protrusions 22 are formed on the bottom surface of each of the recesses 21. The protrusions 22 each have a pyramidal shape (quadrangular pyramidal shape), as shown in FIG. 4, and have four inclining surfaces 221 as side surfaces that incline with respect to an upper surface 23 of the base mount 2 by an inclination angle θ2. The sidewall surface of each of the recesses 21 (surface that connects bottom surface of recess 21 to upper surface 23) is also an inclining surface 211, which inclines with respect to the upper surface 23 of the base mount 2 by an inclination angle θ1. The inclining surfaces 211 and 221 may not reflect the light LL. To form the inclining surfaces 211 and 221 in such a way that they do not reflect the light LL, a micropore array may, for example, be formed on the surfaces. The amount of light LL reflected off the second regions 122 and received by the light receiving section 43 can therefore be reduced. Providing no micropore array allows the surfaces to reflect the light LL and simplifies the step of manufacturing the encoder scale 1. The inclination angle θ1 of the inclining surfaces 211 and the inclination angle θ2 of the inclining surfaces 221 only need to allow reflection of the light LL in a direction different from the direction in which the light LL is reflected off the reflection surfaces 33 and are not limited to a specific value.

In FIG. 3, the plurality of protrusions 22 have the same size and are regularly arranged but may have sizes different from one another and may be arranged at random. The plurality of protrusions 22 each have a quadrangular shape, as shown in FIG. 5, and are aligned with one another in terms of the orientation in the plan view. The plurality of protrusions 22 may be oriented in any direction in the plan view, and in the present embodiment, the plurality of protrusions 22 in the plurality of second regions 122 are oriented in the same direction. Therefore, in a case where the edges of each of the protrusions 22 provided in a second region 122 in the plan view are parallel or perpendicular to a direction B, in which the second region 122 extends, the edges of each of the protrusions 22 provided in another second region 122 in the plan view rotated by 55° around the axial line ax with respect to the second region 122 inclines by 55° with respect to a direction C, in which the other second region 122 extends.

As described above, the encoder scale 1 includes the plate-shaped base mount 2 and the optical pattern 12, which is provided on one surface of the plate-shaped base mount 2 (upper surface in FIGS. 1 and 3) and on which the first regions 121 and the second regions 122 are alternately arranged. In particular, the first regions 121 are primarily formed of the reflection surfaces 33, which are "first surfaces" a normal to each of which extends in the thickness direction of the base mount 2, and the second regions 122 are primarily formed of the inclining surfaces 221, which are a plurality of "second surfaces" that incline with respect to the reflection surfaces 33. The phrase "the first regions 121 are primarily formed of the reflection surfaces 33 (first surfaces)" means that the reflection surface 33 (first surface) in each of the first regions 121 in the plan view has an area occupancy ratio of at least 50% (preferably at least 70%, more preferably at least 90%). Similarly, the phrase "the second regions 122 are primarily formed of the inclining surfaces 221 (second surfaces)" means that the inclining surfaces 221 (second surfaces) in each of the second regions 122 in the plan view has an area occupancy ratio of at least 50% (preferably at least 70%, more preferably at least 90%). The second regions 122 may include surfaces a normal to each of which extends in the thickness direction of the base mount 2 (first surfaces) the same as the reflection surfaces 33 do. In this case, however, the area occupancy ratio of the surfaces in the second regions 122 needs to be smaller than the area occupancy ratio of the reflection surfaces 33 (first surfaces) in the first regions 121.

According to the thus configured encoder scale 1, since the first regions 121 are formed of the reflection surfaces 33, a normal to each of which extends in the thickness direction of the base mount 2, and the second regions 122 are formed of the inclining surfaces 221, which incline with respect to the reflection surfaces 33, the light reflected off the first regions 121 and the light reflected off the second regions 122 are allowed to travel in directions different from each other, whereby the light receiving section 43 can selectively receive only the light LL reflected off the first regions 121. The base mount 2 does not therefore need to be made of a transparent material, whereby the material of the base mount 2 can be selected with increased flexibility. As a result, a material that is less expensive and more excellent in processability can be used. Further, the amount of light received by the light receiving section 43 in the state in which the first regions 121 are irradiated with the light LL and the amount of light received by the light receiving section 43 in the state in which the first regions 121 are not irradiated with the light LL are allowed to greatly differ from each other, resulting in an increase in the detection accuracy. More specifically, the amount of light received by the light receiving section 43 in the state in which the first regions 121 are irradiated with the light LL can be greater than or equal to 57% the amount of light LL from the light source section 42, and the amount of light received by the light receiving section 43 in the state in which the second regions 122 are irradiated with the light LL can be smaller than or equal to 5% the amount of light LL from the light source section 42. In the encoder scale 1, it can also be said that the inclining surfaces 211 also form the "second surfaces" (reflection surfaces).

In contrast, for example, if the second regions 122 are each formed of a flat surface a normal to which is parallel to a normal to each of the first regions 121 (reflection surfaces 33), it is difficult to achieve sufficiently low reflectance (smaller than or equal to 5%) in the second regions 122 even when the flat surface is so processed that the amount of light LL reflected of the flat surface is reduced (for example, roughening for scattering light by providing irregular surface formed primarily of combination of curved surfaces and blackening for increasing light absorptance). Therefore, in the state in which the second regions 122 are irradiated with the light LL from the light source section 42, the amount of light LL reflected off the second regions 122 and incident on the light receiving section 43 cannot be sufficiently small.

In the present embodiment, the encoder scale 1 includes the metal film 3, which is disposed in the first regions 121. The reflectance of the light LL in the first regions 121 (reflection surfaces 33, which are first surfaces) can therefore be increased irrespective of the material of which the base mount 2 is made. Further, in the case where the second regions 122 (inclining surfaces 211 and 221, which are second surfaces) are formed in an etching process, as will be described later, the metal film 3 can be used as a metal mask used in the etching process, whereby the manufacturing cost of the encoder scale 1 can be reduced. Examples of the material of which the metal film 3 is made may include aluminum, copper, iron, nickel, titanium, tungsten or any other metal or an alloy containing some of the metals described above (composite material). A method for forming the metal film 3 is, for example, evaporation, sputtering, or any other dry plating, wet plating, even an inkjet printing, screen printing, or any other printing method, or a transferring method. The thickness of the metal film 3 is not limited to a specific value and is preferably greater than or equal to 0.001 µm but smaller than 100 µm, more preferably greater than or equal to 0.05 µm but smaller than 0.5 µm.

The metal film 3 has portions 32, which protrude toward the recesses 21. The portions 32 result from side etching that occurs in anisotropic etching, which will be described later. The portions 32 can reduce the amount of reflection of the light LL off the inclining surfaces 211. It is noted that the metal film 3 may be omitted. In this case, the upper surface 23 of the base mount 2 forms the "first surfaces" (reflection surfaces). Also in this case, the first regions 121 are allowed to have a relatively excellent light reflection characteristic. The material of which the metal film 3 is made will be described later in detail along with the description of a method for manufacturing the encoder scale 1.

The base mount 2 may be made of any material and is preferably made of single-crystal silicon, silicon carbide, quartz, or any other crystal material that can be anisotropically etched. The optical pattern 12 can thus be formed with precision, as will be described later. Further, the crystal planes of a crystal material can be used to form the reflection surfaces 33 (first surfaces) and the inclining surfaces 221 (second surfaces).

The material of which the base mount 2 is made is preferably single-crystal silicon. Single-crystal silicon is less expensive than the other crystal materials and is readily processed with precision. When the base mount 2 of the encoder scale 1 is made of single-crystal silicon, reduction in the cost of the encoder scale 1 and precise manufacturing thereof can be readily and advantageously achieved.

In particular, the single crystal used to form the base mount 2 preferably has (100) plane orientation. In this case, the [100] plane of the single crystal can be used to form the upper surface 23 and the reflection surfaces 33 (first surfaces), and the [111] plane of the single crystal can be used to form the inclining surfaces 211 and 221 (second surfaces). The [111] plane appears every 90° in the plane of the base mount 2. The thus selected single-crystal silicon can therefore be used to form not only a linear encoder but the encoder scale 1 suitable for a rotary encoder, as in the present embodiment. FIGS. 6 and 7 show SEM photographs of the encoder scale 1 formed by using single-crystal silicon as described above. The amount of light LL reflected off the second regions 122 of the encoder scale 1 formed by using single-crystal silicon and received by the light receiving section 43 can be 3% the amount of light LL from the light source section 42 or smaller, as shown in FIG. 8.

As described above, the inclining surfaces 211 and 221 (second surfaces) are preferably provided along the crystal planes of a crystal material used to form the base mount 2. The inclining surfaces 211 and 221 (second surfaces) can therefore be so readily formed that the inclination angles θ1 and θ2 with respect to the upper surface 23 (first surfaces) of the base mount 2 vary only by a small amount. In the case where the base mount 2 is made of single-crystal silicon, the inclination angle θ2 of the inclining surfaces 221 is about 55° (theoretical value), and the inclination angle θ1 of the inclining surfaces 211 varies depending on the position in the circumferential direction of the encoder scale 1.

The recesses 21 are provided in one surface (upper surface in FIGS. 1 and 3) of the base mount 2 in correspondence with the second regions 122. The second regions 122 (inclining surfaces 211 and 221, which are second surfaces) can therefore be readily formed in an etching process, as will be described later.

In particular, the plurality of protrusions 22 are provided in each of the second regions 122 of the base mount 2, and the inclining surfaces 221 (second surfaces) are formed by using the side surfaces of the protrusions 22. Therefore, in the case where the second regions 122 (inclining surfaces 211, which are second surfaces) are formed in an etching process, the amount of etching can be reduced, whereby the manufacturing period can be shortened and the manufacturing cost can be reduced accordingly. In contrast, for example, in a case where the second regions 122 are formed only of the inclining surfaces 211, the base mount 2 needs to be etched deeper, which requires a long manufacturing period, resulting in an increase in the manufacturing cost.

As described above, the encoder 10 includes the encoder scale 1 described above. The detection accuracy the encoder 10 can therefore be increased with cost reduction.

That is, the encoder 10 includes the encoder scale 1, the light source section 42, which outputs the light LL toward the encoder scale 1, and the light receiving section 43, which receives the light LL reflected off the encoder scale 1. The encoder scale 1 includes the plate-shaped base mount 2 and the optical pattern 12, which is provided on one surface (upper surface in FIGS. 1 and 3) of the base mount 2 and has the alternately arranged first regions 121 and second regions 122, as described above. The first regions 121 are primarily formed of the reflection surfaces 33, which are the "first surfaces" a normal to each of which extends in the thickness direction of the base mount 2, and the second regions 122 are primarily formed of the inclining surfaces 211 and 221, which are the "second surfaces" that reflect the light LL in a direction different from the direction in which the light LL is reflected off the reflection surfaces 33. The thus configured encoder 10 allows an increase in detection accuracy with cost reduction.

Method for Manufacturing Encoder Scale

Figure 9:
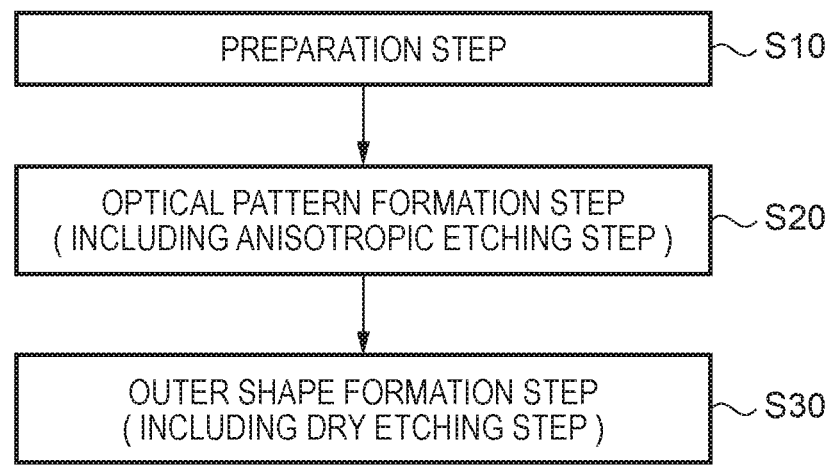
FIG. 9 is a flowchart for describing a method for manufacturing the encoder scale shown in FIG. 3.

FIG. 9 is a flowchart for describing a method for manufacturing the encoder scale shown in FIG. 3.

The method for manufacturing the encoder scale 1 includes a preparation step S10, an optical pattern formation step S20, and an outer shape formation step S30, as shown in FIG. 9. The steps will be sequentially described below. The following description will be made with reference to the case where the base mount 2 is made of (100) single-crystal silicon.

Preparation Step S10

Figure 10:
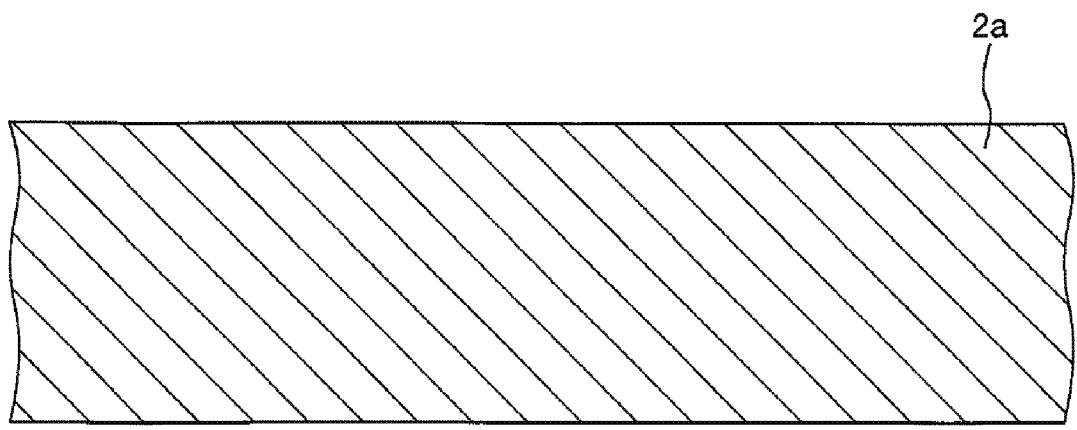
FIG. 10 is a cross-sectional view for describing a preparation step shown in FIG. 9.

FIG. 10 is a cross-sectional view for describing the preparation step shown in FIG. 9.

First, a base mount 2a, which is a (100) single-crystal silicon substrate, is prepared, as shown in FIG. 10. The single-crystal silicon substrate may be used as it is as the base mount 2a, but one surface of the single-crystal silicon substrate is so polished as required that the thickness of the substrate is reduced, and the resultant substrate is used as the base mount 2a.

Optical Pattern Formation Step S20

Figure 11:
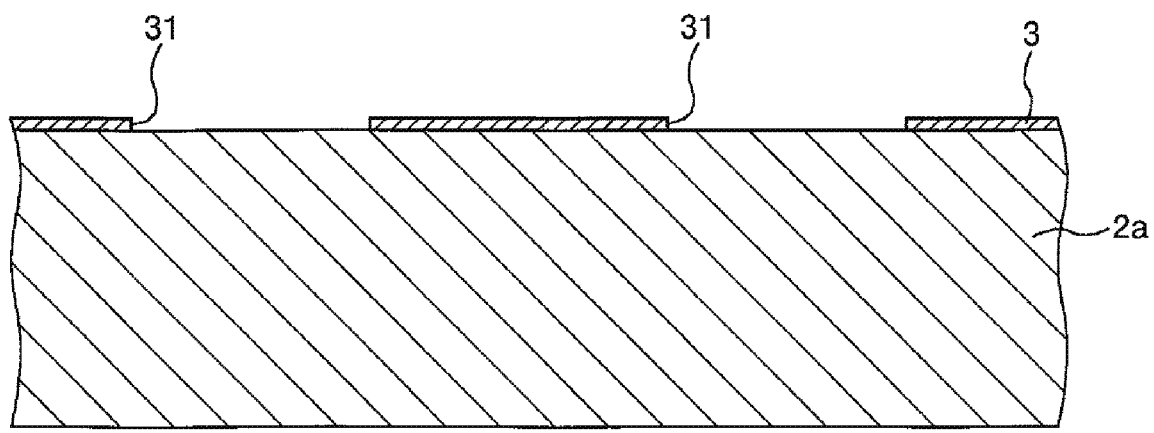
FIG. 11 is a cross-sectional view for describing an optical pattern formation step (mask formation step) shown in FIG. 9.
Figure 12:
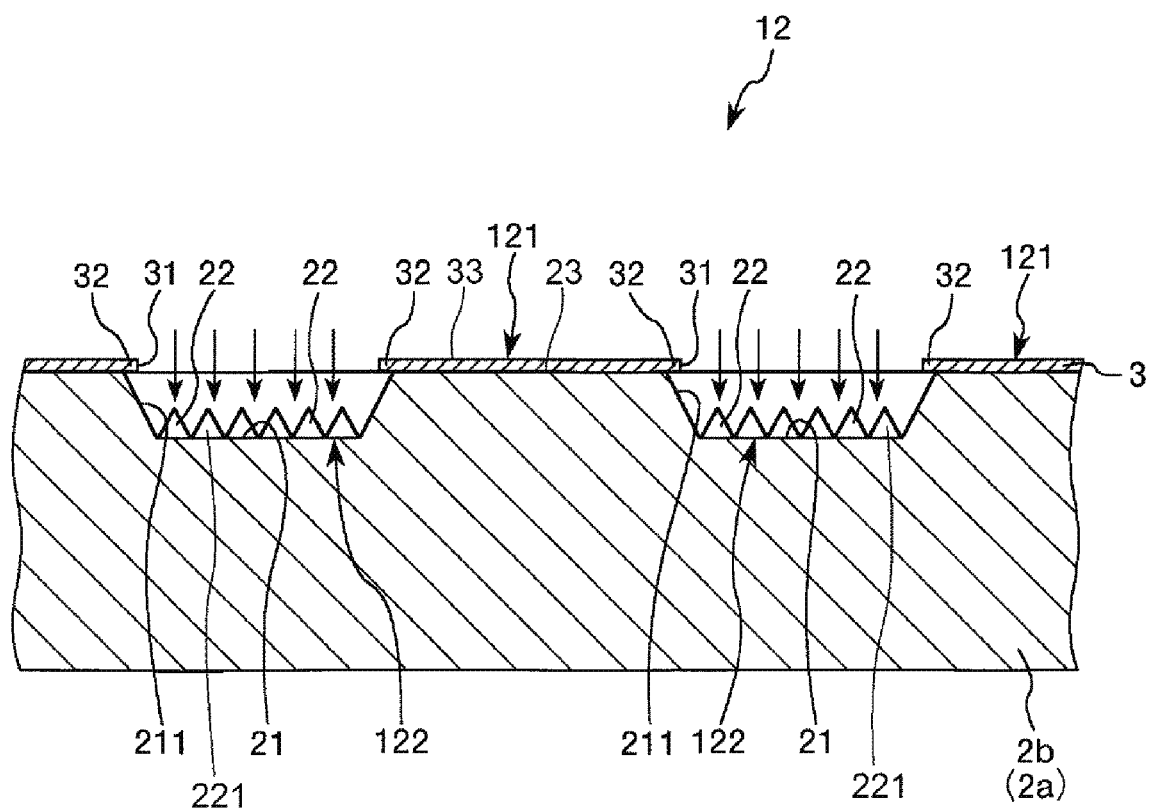
FIG. 12 is a cross-sectional view for describing the optical pattern formation step (anisotropic etching step) shown in FIG. 9.

FIG. 11 is a cross-sectional view for describing the optical pattern formation step (mask formation step) shown in FIG. 9. FIG. 12 is a cross-sectional view for describing the optical pattern formation step (anisotropic etching step) shown in FIG. 9.

The metal film 3 is then formed on one surface of the base mount 2a, as shown in FIG. 11. The metal film 3 is produced, for example, by forming a metal film uniformly on one surface of the base mount 2a, then forming a photoresist mask on the metal film, etching the metal film via the mask, and then removing the mask.

The metal film 3 is then used as a mask to anisotropically etch the base mount 2a, and the base mount 2a is cleaned as required, as shown in FIG. 12. A base mount 2b having a plurality of recesses 21 and a plurality of protrusions 22 is thus produced.

The anisotropic etching (wet etching) is not limited to specific etching and uses an alkali etchant made, for example, of KOH and TMAH.

In the present example, the material of which the metal film 3 is made is selected from those described above because the metal film 3 is eventually used as the reflection surfaces of the encoder scale 1. Among the materials described above, it is preferable to employ a material that reflects the light LL and is resistant to anisotropic etching. For example, TiW or any other similar metal material can be used.

In a case where the eventually produced encoder scale 1 includes no metal film 3, the metal film 3 described above may be replaced with a silicon oxide film produced by thermally oxidizing a surface of the base mount 2a, a film produced by depositing a material that does not reflect the light LL, or any other suitable film. In this case, the film may be removed in dry etching or wet etching process after the film is used as the mask in the anisotropic etching.

Outer Shape Formation Step

Although not shown, the base mount 2a is dry etched to form the outer shape (including hole 11) of the encoder scale 1. In the present step, for example, before the dry etching, a resist layer is formed as a protective layer on the metal film 3, and the resist layer is removed after the dry etching. In the case where the eventually produced encoder scale 1 includes no metal film 3, the metal film 3 may be removed after the outer shape formation step.

The dry etching in the present step is not limited to specific dry etching and may, for example, be performed based on a Si high-speed etching method, a Bosch process method, a reactive ion etching (ROI) method, and an ICP (inductively coupled plasma) method. As an etching gas, $Cl_2$+HBr, $SF_6$, or any other gas can be used.

The encoder scale 1 can be manufactured as described above.

As described above, the method for manufacturing the encoder scale 1 includes the preparation step S10 of preparing the base mount 2a and the optical pattern formation step S20 of forming the optical pattern 12 having the plurality of alternately arranged first regions 121 and second regions 122. In the optical pattern formation step S20, the first regions 121, which are primarily formed of the reflection surfaces 33 (or upper surface 23), which are the "first surfaces" a normal to each of which extends in the thickness direction of the base mount 2a, and the second regions 122, which are primarily formed of the inclining surfaces 221, which are the "second surfaces" that incline with respect to the reflection surfaces 33 (or upper surface 23), are formed on a surface of the plate-shaped base mount 2a. The second regions 122 are formed in an anisotropic etching process. According to the thus configured method for manufacturing the encoder scale 1, the encoder scale 1 that allows an increase in detection accuracy with cost reduction can be produced.

Second Embodiment

Figure 13:
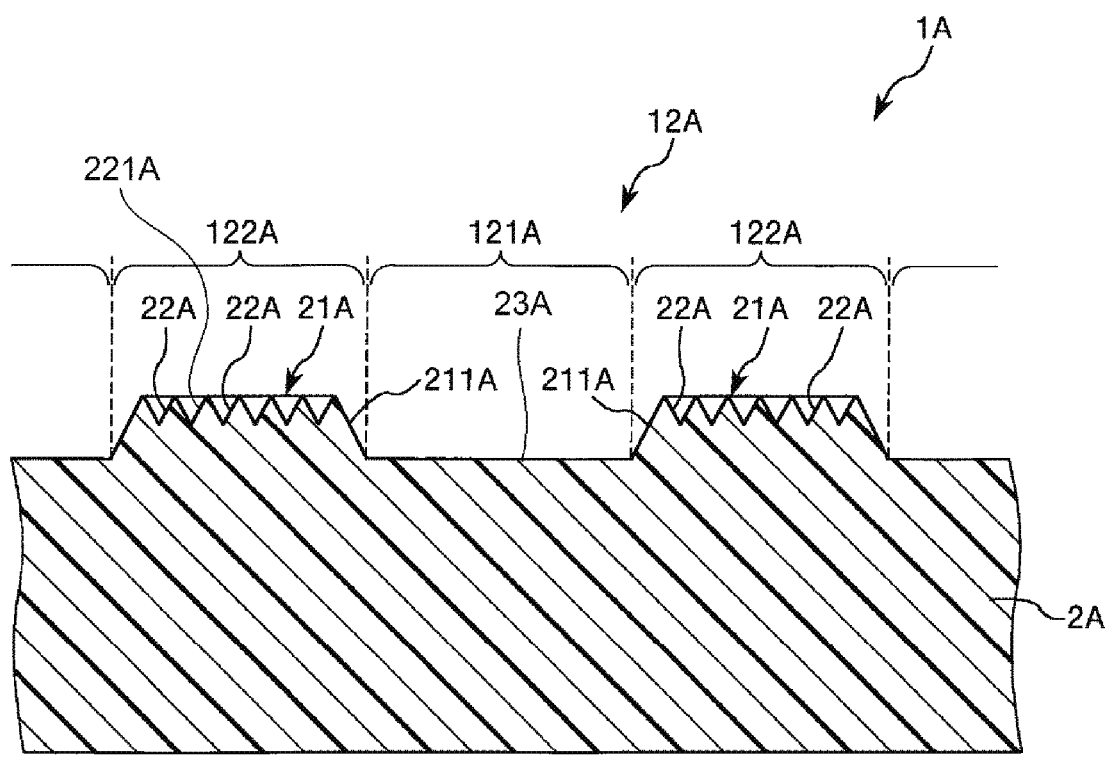
FIG. 13 is a cross-sectional view showing an encoder scale according to a second embodiment of the invention.
Figure 14:
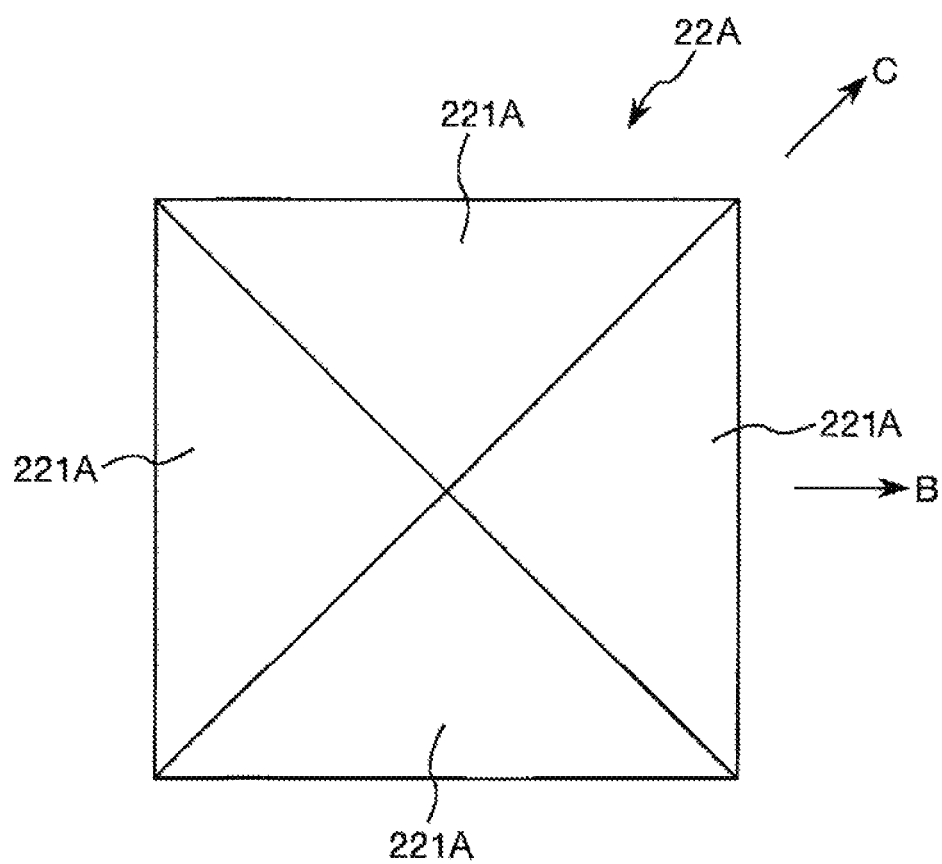
FIG. 14 is a plan view of one of recesses (second surfaces) provided in second regions shown in FIG. 13.

FIG. 13 is a cross-sectional view showing an encoder scale according to a second embodiment of the invention. FIG. 14 is a plan view of one of recesses provided in each of second regions shown in FIG. 13. The following description will be primarily made of differences between the present embodiment and the embodiment described above, and the same items will not be described.

On one surface of an encoder scale 1A shown in FIG. 13 is provided an optical pattern 12A having a plurality of first regions 121A and second regions 122A alternately arranged along the circumferential direction of the encoder scale 1A. The shape of the optical pattern 12A is a reversed version of the shape of the optical pattern 12 in the first embodiment described above. Specifically, the encoder scale 1A includes a plate-shaped (disc-shaped) base mount 2A, and a plurality of protrusions 21A are provided on the upper surface of the base mount 2A in correspondence with the plurality of second regions 122A. The portion that forms the upper surface of the base mount 2A but excludes the plurality of protrusions 21A forms the first regions 121A as reflection surfaces 23A. On the other hand, the outer wall surfaces (sidewall surfaces and top surfaces) of the protrusions 21A form the second regions 122A.

In particular, a plurality of recesses 22A are formed in the top surface of each of the protrusions 21A. The recesses 22A each have an inverted quadrangular pyramidal shape and have four inclining surfaces 221A as side surfaces that incline with respect to the reflection surfaces 23A of the base mount 2A, as shown in FIG. 14. The sidewall surface of each of the protrusions 21A (surface that connects top surface to reflection surface 23A) is also an inclining surface 211A, which inclines with respect to the reflection surface 23A of the base mount 2A. The thus configured inclining surfaces 211A and 221A each may not reflect the light LL.

The thus configured encoder scale 1A can be produced relatively simply and inexpensively, for example, by molding a resin material or any other material by using as a die a structure formed of the encoder scale 1 according to the first embodiment described above from which the metal film 3 is removed.

As described above, the encoder scale 1A includes the plate-shaped base mount 2A and the optical pattern 12A, which is provided on one surface (upper surface in FIG. 13) of the base mount 2A and has the plurality of alternately arranged first regions 121A and second regions 122A, as described above. In particular, the first regions 121A are formed of the reflection surfaces 23A, which are the "first surfaces" a normal to each of which extends in the thickness direction of the base mount 2A, and the second regions 122A are formed of the inclining surfaces 211A, which are the plurality of "second surfaces" that incline with respect to the reflection surfaces 23A.

The thus configured encoder scale 1A according to the second embodiment described above also allows an increase in detection accuracy with cost reduction, as in the first embodiment described above.

Third Embodiment

Figure 15:
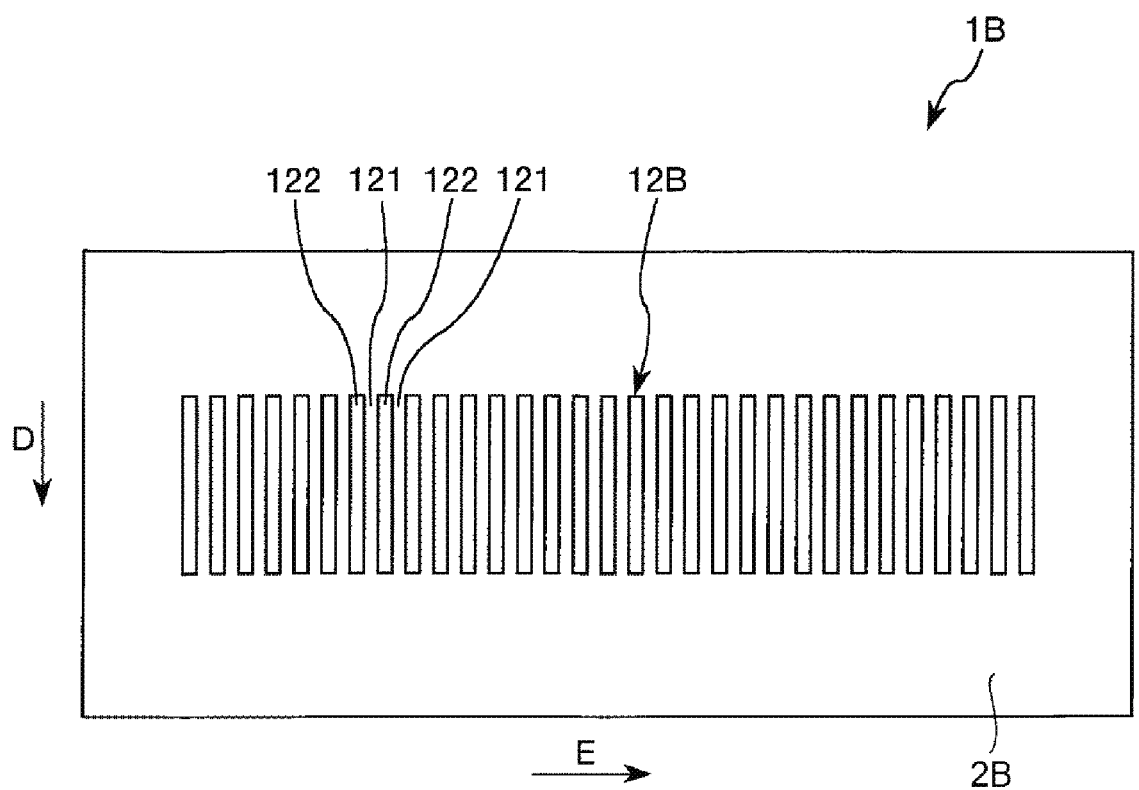
FIG. 15 is a plan view showing an encoder scale according to a third embodiment of the invention.

FIG. 15 is a plan view showing an encoder scale according to a third embodiment of the invention. The following description will be primarily made of differences between the present embodiment and the embodiments described above, and the same items will not be described.

An encoder scale 1B shown in FIG. 15 includes a plate-shaped base mount 2B, and an optical pattern 12B is formed on one surface of the base mount 2B. The optical pattern 12 B has first regions 121 and second regions 122 alternately arranged along a direction E in FIG. 15 as a pattern that allows detection of the amount of movement, the movement speed, and other factors of the encoder scale 1B in the direction E. The thus configured encoder scale 1B can be used as a linear encoder.

The first regions 121 and the second regions 122 of the optical pattern 12B each extend along a direction D, which is perpendicular to the direction E, in the plan view. Further, the widths of the first regions 121 and the second regions 122 are each fixed along the direction D in the plan view. In the plan view, the base mount 2B has an oblong shape having long edges extending in the direction E.

The thus configured encoder scale 1B can be simply formed with precision by using (100) single-crystal silicon, as in the first embodiment described above. In this case, the crystal orientation (110) preferably coincides with the direction D. In this case, the dimensional precision of the first regions 121 and the second regions 122 can be readily increased.

The thus configured encoder scale 1B according to the third embodiment described above also allows an increase in detection accuracy with cost reduction, as in the first embodiment described above.

Robot

A robot according to an embodiment of the invention will be described below with reference to a single-arm robot.

Figure 16:
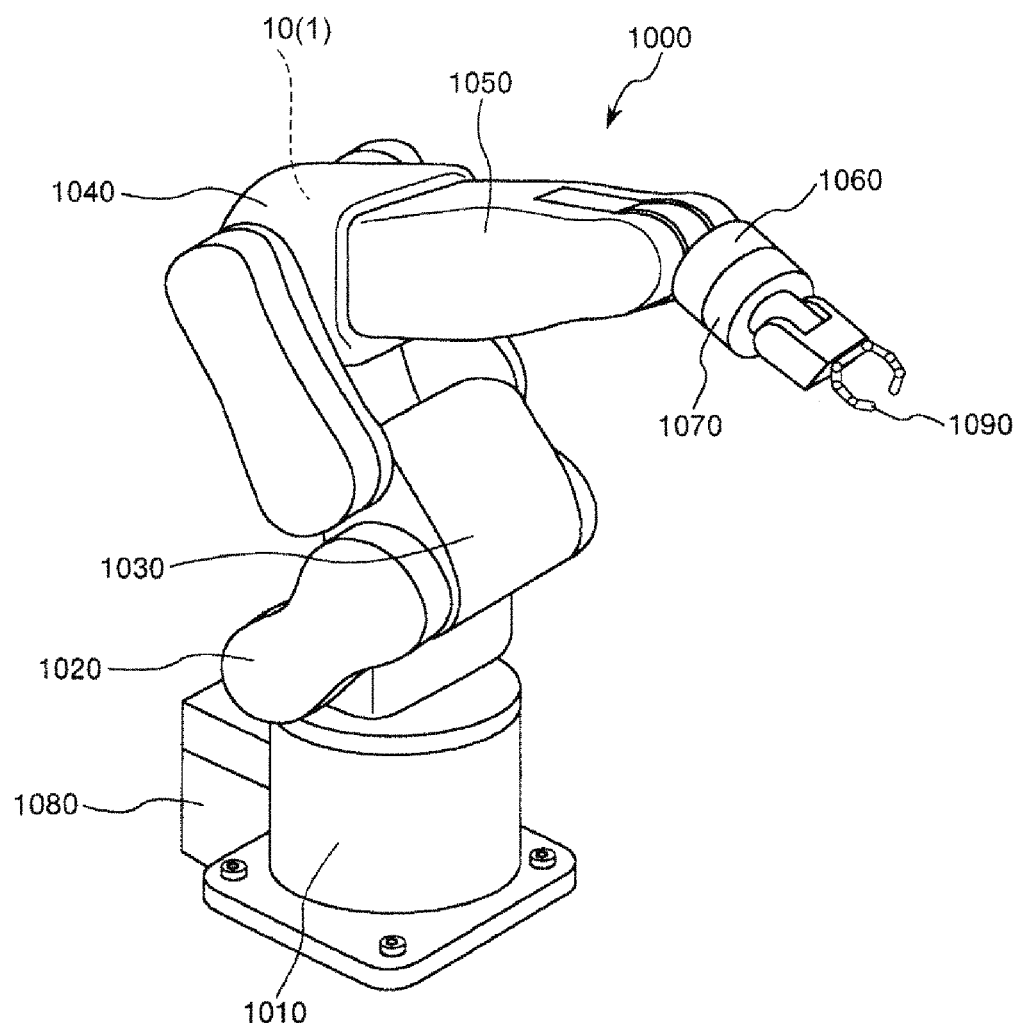
FIG. 16 is a perspective view showing a robot according to an embodiment of the invention.

FIG. 16 is a perspective view showing the robot according to the embodiment of the invention.

A robot 1000 shown in FIG. 16 can deliver, remove, transport, assemble, and otherwise work a precision instrument and a part (target object) that forms the precision instrument. The robot 1000 is a six-axis robot and includes a base 1010, which is fixed to a floor or a ceiling, an arm 1020, which is pivotably linked to the base 1010, an arm 1030, which is pivotably linked to the arm 1020, an arm 1040, which is pivotably linked to the arm 1030, an arm 1050, which is pivotably linked to the arm 1040, an arm 1060, which is pivotably linked to the arm 1050, an arm 1070, which is pivotably linked to the arm 1060, and a controller 1080, which controls drive operation of the arms 1020, 1030, 1040, 1050, 1060, and 1070. The arm 1070 is provided with a hand connector, to which an end effector 1090 according to the type of work performed by the robot 1000 is attached to the hand connector.

The encoder 10 is incorporated in all or part of a plurality of joints of the robot 1000, and the controller 1080 controls the drive operation of each of the joints based on the output from the encoder 10. In FIG. 16, the encoder 10 is provided in the joint between the arms 1040 and 1050.

As described above, the robot 1000 includes the encoder scale 1 (or 1A, 1B). According to the thus configured robot 1000, the cost reduction achieved by the encoder scale 1 allows reduction in cost of the robot 1000. Further, the operation of the robot 1000 can be controlled with precision based on a result of precise detection using the encoder scale 1.

The number of arms of the robot 1000 is six in FIG. 16, but not necessarily, and may range from 1 to 5 or may be 7 or greater.

Printer

Figure 17:
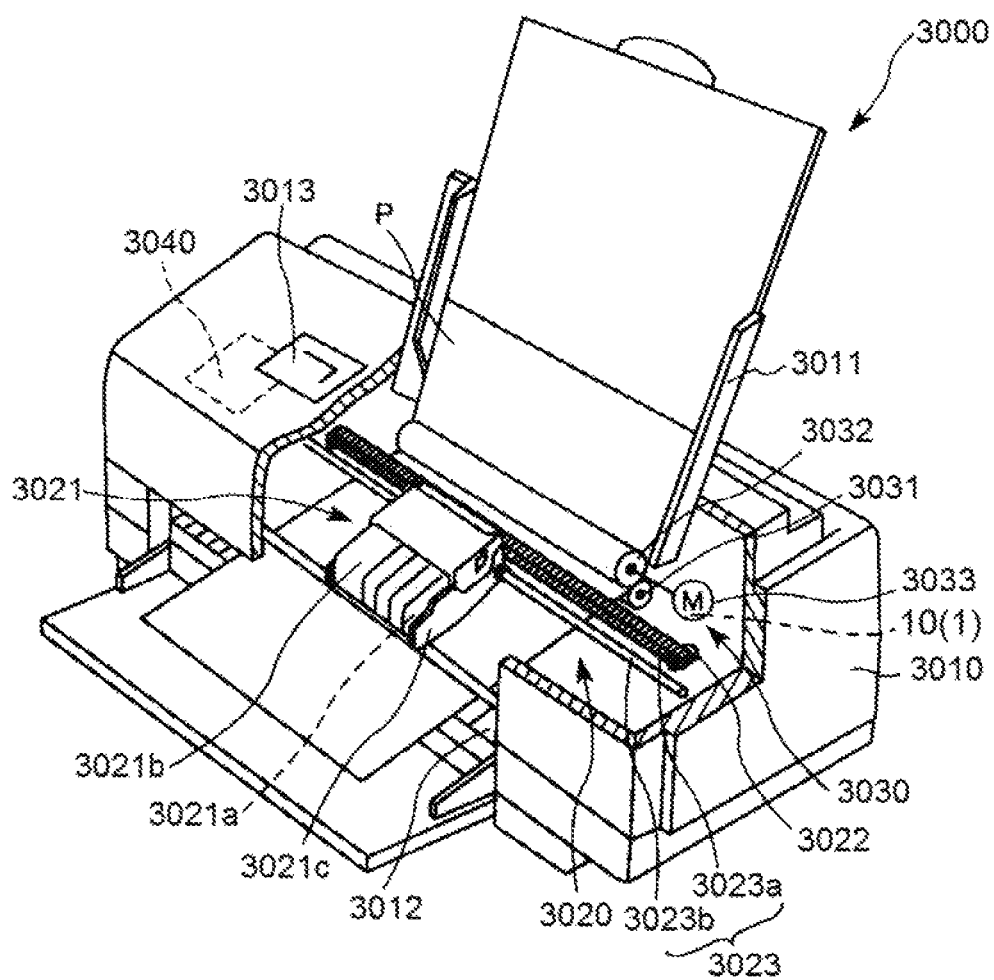
FIG. 17 is a perspective view showing a printer according to an embodiment of the invention.

FIG. 17 is a perspective view showing a printer according to an embodiment of the invention.

A printer 3000 shown in FIG. 17 is a printer based on inkjet recording. The printer 3000 includes an apparatus body 3010, a printing mechanism 3020, which is provided in the apparatus body 3010, a sheet feeding mechanism 3030, and a controller 3040.

The apparatus body 3010 is provided with a tray 3011, on which recording sheets P are placed, a sheet ejecting port 3012, through which a recording sheet P is ejected, and an operation panel 3013, such as a liquid crystal display.

The printing mechanism 3020 includes a head unit 3021, a carriage motor 3022, and a reciprocating mechanism 3023, which causes the head unit 3021 to make reciprocating motion based on drive force produced by the carriage motor 3022. The head unit 3021 includes a head 3021a, which is a head based on inkjet recording, an ink cartridge 3021b, which supplies the head 3021a with ink, and a carriage 3021c, on which the head 3021a and the ink cartridge 3021b are mounted. The reciprocating mechanism 3023 includes a carriage guide shaft 3023a, which supports the carriage 3021c in such a way that the carriage 3021c can make reciprocating motion, and a timing belt 3023b, which moves the carriage 3021c along the carriage guide shaft 2023a based on the drive force produced by the carriage motor 3022.

The sheet feeding mechanism 3030 includes a driven roller 3031 and a drive roller 3032, which are in contact with each other and pressed against each other, a sheet feeding motor 3033, which drives the drive roller 3032, and the encoder 10, which detects the state of the rotation of the rotary shaft of the sheet feeding motor 3033.

The controller 3040 controls the printing mechanism 3020, the sheet feeding mechanism 3030, and other components based on printing data inputted from a host computer, for example, a personal computer.

In the thus configured printer 3000, the sheet feeding mechanism 3030 intermittently feeds the recording sheets P one by one to a position below and in the vicinity of the head unit 3021. At this point, the head unit 3021 makes reciprocating motion in a direction roughly perpendicular to the direction in which the recording sheet P is fed to perform printing on the recording sheet P.

As described above, the printer 3000 includes the encoder scale 1 (or 1A, 1B). According to the thus configured printer 3000, the cost reduction achieved by the encoder scale 1 allows reduction in cost of the printer 3000. Further, the operation of the printer 3000 can be controlled with precision based on a result of precise detection using the encoder scale 1.

The encoder scales, the method for manufacturing the encoder scales, the encoder, the robot, and the printer according to the embodiments of the invention have been described above with reference to the drawings, but the invention is not limited to the embodiments, and the configuration of each portion or item of the encoder scales, the method for manufacturing the encoder scales, the encoder, the robot, and the printer can be replaced with a portion or item having an arbitrary configuration having the same function. Further, an arbitrarily constituent part may be added to the encoder scales, the method for manufacturing the encoder scales, the encoder, the robot, and the printer according to the embodiments of the invention.

Further, in the aforementioned embodiments of the invention, arbitrary two or more configurations (features) may be combined with each other.

The robot according to the embodiment of the invention is not limited to a single-arm robot and may be any robot including an arm, for example, a double-arm robot and a SCARA robot.

The aforementioned embodiments have been described with reference to the configuration in which the encoder scale unit and the encoder are used in a robot and a printer, and the encoder scale unit and the encoder can also be used in a variety of other electronic instruments. Further, the encoder, when used in a printer, is not necessarily used in a drive source that drives the sheet feeding roller of the printer and can be used, for example, in a drive source that drives the inkjet head of the printer.

The encoder according to the embodiment of the invention may be assembled in an instrument other than a robot, for example, may be incorporated in a moving object, such as an automobile.

The entire disclosure of Japanese Patent Application No. 2017-091156, filed May 1, 2017 is expressly incorporated by reference herein.

What is claimed is:

1. An encoder scale comprising:
a plate-shaped base mount; and
an optical pattern that is provided on one surface of the base mount and has alternately arranged first regions and second regions;
wherein the first regions are each primarily formed of a first surface a normal to which extends in a thickness direction of the base mount, and a metal film is disposed in each of the first regions,
the plate-shaped base mount includes a plurality of recesses at the second regions, each of the recesses including a sidewall that is connected to the first surface, and the second regions are each primarily formed of a second surface that inclines with respect to the first surface,
openings are provided in the metal film that correspond to the second regions, and
the metal film protrudes outward from the first surface to overlap the sidewall of the recess.

2. The encoder scale according to claim 1, wherein the base mount is made of an anisotropically etchable crystal material.

3. The encoder scale according to claim 2, wherein the crystal material is single-crystal silicon.

4. The encoder scale according to claim 3, wherein the single-crystal silicon has (100) plane orientation.

5. An encoder comprising the encoder scale according to claim 4.

6. An encoder comprising the encoder scale according to claim 3.

7. A robot comprising the encoder scale according to claim 3.

8. A printer comprising the encoder scale according to claim 3.

9. The encoder scale according to claim 2, wherein the second surfaces are each provided along a crystal plane of the crystal material.

10. An encoder comprising the encoder scale according to claim 2.

11. A robot comprising the encoder scale according to claim 2.

12. A printer comprising the encoder scale according to claim 2.

13. The encoder scale according to claim 1, wherein recesses are provided in the one surface of the base mount in correspondence with the second regions.

14. The encoder scale according to claim 1,
wherein a plurality of protrusions are provided in each of the second regions of the base mount, and
the second surfaces are formed by using side surfaces of the protrusions.

15. An encoder comprising the encoder scale according to claim 1.

16. A robot comprising the encoder scale according to claim 1.

17. A printer comprising the encoder scale according to claim 1.

18. The encoder scale according to claim 1, wherein the second regions are each primarily formed of a plurality of pyramids, and angled surfaces of the pyramids each define the second surface that is inclined with respect to the first surface.

19. A method for manufacturing an encoder scale, the method comprising an optical pattern formation step of forming an optical pattern on one surface of a plate-shaped base mount, the optical pattern having alternately arranged first regions and second regions, the first regions each primarily formed of a first surface a normal to which extends in a thickness direction of the base mount and the second regions each primarily formed of a second surface that inclines with respect to the first surface,
wherein the second regions are formed in an anisotropic etching process,
a metal film is disposed in each of the first regions, and openings are provided in the metal film that correspond to the second regions,
the plate-shaped base mount includes a plurality of recesses at the second regions, each of the recesses including a sidewall that is connected to the first surface, and the second regions are each primarily formed of a second surface that inclines with respect to the first surface, and
the metal film protrudes outward from the first surface to overlap the sidewall of the recess.

20. An encoder comprising:
an encoder scale;
a light source section that outputs light toward the encoder scale; and
a light receiving section that receives the light reflected off the encoder scale,
wherein the encoder scale includes
a plate-shaped base mount, and
an optical pattern that is provided on one surface of the base mount and has alternately arranged first regions and second regions,
wherein the first regions are each primarily formed of a first surface a normal to which extends in a thickness direction of the base mount,
the plate-shaped base mount includes a plurality of recesses at the second regions, each of the recesses including a sidewall that is connected to the first surface, and the second regions, and the second regions are each primarily formed of a second surface that reflects the light in a direction different from a direction in which the light is reflected off the first surface, and a metal film is disposed in each of the first regions, and openings are provided in the metal film that correspond to the second regions, and the metal film protrudes outward from the first surface to overlap the sidewall of the recess.

* * * * *